US012700984B2

(12) United States Patent
Lee et al.

(10) Patent No.: US 12,700,984 B2
(45) Date of Patent: Aug. 4, 2026

(54) DUAL-MODE TRANSMITTER FOR LOW-POWER DOUBLE-DATA RATE (LPDDR)INTERFACE

(71) Applicant: Foundation for Research and Business, Seoul National University of Science and Technology, Seoul (KR)

(72) Inventors: Won Young Lee, Seoul (KR); Hangmin Jo, Seoul (KR)

(73) Assignee: Foundation for Research and Business, Seoul National University of Science and Technology, Seoul (KR)

( * ) Notice: Subject to any disclaimer, the term of this patent is extended or adjusted under 35 U.S.C. 154(b) by 0 days.

(21) Appl. No.: 18/963,730

(22) Filed: Nov. 28, 2024

(65) Prior Publication Data

US 2025/0379717 A1 Dec. 11, 2025

(30) Foreign Application Priority Data

Jun. 7, 2024 (KR) ........................ 10-2024-0074388

(51) Int. Cl.
*H04L 7/00* (2006.01)
*H04L 27/04* (2006.01)

(52) U.S. Cl.
CPC .......... *H04L 7/0087* (2013.01); *H04L 7/0091* (2013.01); *H04L 27/04* (2013.01)

(58) Field of Classification Search
None
See application file for complete search history.

(56) References Cited

U.S. PATENT DOCUMENTS 8,923,382 B2 * 12/2014 Ito ..................... H04L 25/03057
375/233
9,674,025 B2 * 6/2017 Dickson ................. H04L 27/01
(Continued)

FOREIGN PATENT DOCUMENTS

CN 107919873 A * 4/2018 ....... H04L 25/03019
CN 107925408 A * 4/2018 ..... H03K 19/018528
(Continued)

OTHER PUBLICATIONS

H.-W. Yang, A. Roshan-Zamir, Y.-H. Song and S. Palermo, "A low-power dual-mode 20-Gb/s NRZ and 28-Gb/s PAM-4 voltage-mode transmitter," 2017 IEEE Asian Solid-State Circuits Conference (A-SSCC), Seoul, Korea (South), 2017, pp. 261-264, (Year: 2017).*

(Continued)

*Primary Examiner* — Berhanu Tadese
(74) *Attorney, Agent, or Firm* — NKL LAW; Jae Youn Kim

(57) ABSTRACT

A dual-mode transmitter for a low-power double-data rate (LPDDR) interface can be operated in one of a non-return to zero (NRZ) mode and a pulse amplitude modulation (PAM)-4 mode. The dual-mode transmitter includes: a pseudorandom binary sequence (PRBS) generator configured to generate a transmission signal to be transmitted to a dual-mode receiver; at least one serializer configured to serialize the transmission signal; a single-ended to differential (S2D) configured to convert the serialized transmission signal in a form of a single-ended signal into a differential signal; a ZQ calibration configured to generate a result code for matching an impedance value at an output terminal of the dual-mode transmitter with a terminating resistance value of the dual-mode receiver; and a pre-driver configured to combine the (Continued)

differential signal obtained by the converting and the result code.

4 Claims, 12 Drawing Sheets

(56) References Cited

U.S. PATENT DOCUMENTS

| | | | | |
|---|---|---|---|---|
| 9,699,009 | B1 * | 7/2017 | Ainspan | H04L 25/49 |
| 9,876,667 | B2 * | 1/2018 | Dickson | H04L 27/01 |
| 9,973,218 | B2 * | 5/2018 | Zhu | H04B 10/524 |
| 9,998,306 | B2 | 6/2018 | Navid | |
| 10,171,281 | B2 * | 1/2019 | Dickson | H04L 27/364 |
| 10,686,634 | B2 * | 6/2020 | Hollis | G11C 7/1048 |
| 10,924,310 | B2 * | 2/2021 | Toprak-Deniz | H04L 25/03133 |
| 11,128,497 | B1 * | 9/2021 | Sun | H04L 25/03267 |
| 11,233,681 | B2 * | 1/2022 | Hollis | G11C 7/1096 |
| 11,424,968 | B1 * | 8/2022 | Sun | H04L 25/4908 |
| 11,449,274 | B2 * | 9/2022 | Woo | G06F 3/0679 |
| 11,874,788 | B1 * | 1/2024 | Kumar | H03K 19/1776 |
| 12,244,348 | B2 * | 3/2025 | Van Veen | H04L 27/02 |
| 12,362,972 | B2 * | 7/2025 | Lee | H03M 7/165 |
| 12,375,329 | B2 * | 7/2025 | Cai | H04L 27/0008 |
| 12,401,553 | B2 * | 8/2025 | Chun | G06F 5/06 |
| 2018/0076836 | A1 * | 3/2018 | Zhu | H04B 10/541 |
| 2022/0076716 | A1 * | 3/2022 | Um | G11C 7/1084 |
| 2022/0083244 | A1 * | 3/2022 | Um | G11C 7/1084 |
| 2022/0188013 | A1 * | 6/2022 | Woo | G11C 7/1057 |
| 2023/0088409 | A1 * | 3/2023 | Parsons | H04B 10/0731 |
| | | | | 356/73.1 |
| 2023/0254188 | A1 * | 8/2023 | Cai | H04L 27/0008 |
| | | | | 375/353 |
| 2023/0327776 | A1 * | 10/2023 | Van Veen | H04B 10/5161 |
| | | | | 398/183 |
| 2023/0396243 | A1 | 12/2023 | Sanamreddy et al. | |
| 2024/0396771 | A1 * | 11/2024 | Lee | H04L 25/0272 |
| 2025/0379717 | A1 * | 12/2025 | Lee | H04L 7/0087 |
| 2026/0005827 | A1 * | 1/2026 | Tao | H03L 7/091 |

FOREIGN PATENT DOCUMENTS

| | | | | | |
|---|---|---|---|---|---|
| CN | 108463966 | A | * | 8/2018 | H04L 25/03057 |
| CN | 110036577 | A | * | 7/2019 | H04J 3/1652 |
| CN | 107925408 | B | * | 8/2021 | H04L 27/04 |
| CN | 114627914 | A | * | 6/2022 | G11C 7/1036 |
| CN | 115694527 | A | * | 2/2023 | |
| CN | 113890800 | B | * | 4/2024 | H04L 25/03006 |
| CN | 118264513 | A | * | 6/2024 | H04L 41/0896 |
| CN | 118264513 | B | * | 8/2024 | H04L 41/0896 |
| CN | 120223480 | A | * | 6/2025 | H04L 25/03267 |
| EP | 2134066 | B1 | * | 11/2012 | H04M 1/2748 |
| EP | 3496350 | A1 | * | 6/2019 | H04L 27/26 |
| EP | 3496350 | B1 | * | 10/2020 | H04B 10/541 |
| EP | 3968327 | A1 | * | 3/2022 | G11C 7/1084 |
| EP | 3968328 | A1 | * | 3/2022 | G11C 7/10 |
| EP | 4258606 | A2 | * | 10/2023 | H04L 27/02 |
| EP | 3968328 | B1 | * | 7/2025 | H04L 25/4917 |
| JP | 2018528690 | A | * | 9/2018 | H03K 19/018528 |
| JP | 6850793 | B2 | * | 3/2021 | H04L 25/06 |
| KR | 20040010288 | A | | 1/2004 | |
| KR | 20180042396 | A | * | 4/2018 | H04L 25/085 |
| KR | 20180091221 | A | | 8/2018 | |
| KR | 102220171 | B1 | | 2/2021 | |
| KR | 20220023896 | A | | 3/2022 | |
| KR | 20220083883 | A | * | 6/2022 | G11C 7/1036 |
| KR | 20220141938 | A | * | 10/2022 | H04L 1/0059 |
| KR | 102479138 | B1 | * | 12/2022 | H04B 3/06 |
| KR | 102546914 | B1 | * | 6/2023 | H04L 27/04 |
| KR | 102608463 | B1 | * | 11/2023 | H03M 7/165 |
| KR | 20230164251 | A | * | 12/2023 | H04L 25/0314 |
| KR | 102646553 | B1 | * | 3/2024 | H04L 25/0314 |
| KR | 20240044269 | A | * | 4/2024 | G11C 7/1069 |
| KR | 20240083646 | A | * | 6/2024 | H03K 23/40 |
| KR | 20240083647 | A | * | 6/2024 | H03L 7/087 |
| KR | 102754222 | B1 | * | 1/2025 | H04L 1/00 |
| KR | 102761762 | B1 | * | 2/2025 | H03K 3/037 |
| KR | 102779504 | B1 | * | 3/2025 | H04L 27/04 |
| WO | WO-2021163534 | A1 | * | 8/2021 | H04B 10/0731 |
| WO | WO-2025244269 | A1 | * | 11/2025 | H03K 3/037 |
| WO | WO-2025244270 | A1 | * | 11/2025 | H04L 1/00 |

OTHER PUBLICATIONS

J. Kim et al., "3.5 A 16-to-40Gb/s quarter-rate NRZ/PAM4 dual-mode transmitter in 14nm CMOS," 2015 IEEE International Solid-State Circuits Conference—(ISSCC) Digest of Technical Papers, San Francisco, CA, USA, 2015, pp. 1-3, (Year: 2015).*

J. Zhou, J. Jin, Y. Lin, S. Wang, B. Wang and T. Mo, "A 24/48 Gb/s NRZ/PAM-4 Dual-Mode Transmitter with 3-tap FFE in 28 nm CMOS," 2023 IEEE 15th International Conference on ASIC (ASICON), Nanjing, China, 2023, pp. 1-4, (Year: 2023).*

C. Hyun, H. Ko, J.-H. Chae, H. Park and S. Kim, "A 20Gb/s Dual-Mode PAM4/NRZ Single-Ended Transmitter with RLM Compensation," 2019 IEEE International Symposium on Circuits and Systems (ISCAS), Sapporo, Japan, 2019, pp. 1-4 (Year: 2019 ).*

* cited by examiner

NRZ

PAM-4

DUAL-MODE TRANSMITTER FOR LOW-POWER DOUBLE-DATA RATE (LPDDR)INTERFACE

BACKGROUND OF THE INVENTION

Field of the Invention

The present disclosure relates to a dual-mode transmitter for a low-power double-data rate (LPDDR) interface, the dual-mode transmitter operating in one of a non-return to zero (NRZ) mode and a pulse amplitude modulation (PAM)-4 mode.

Background of the Related Art

FIG. 1 is a diagram illustrating data rates according to a memory interface.

As shown in FIG. 1, since a bandwidth needed by the memory interface is increased with advancement in data transmission systems, there is a need to introduce multi-level signaling.

As the data transmission systems advance, a speed of serial lines has been increased along with improvement in power efficiency over past few years.

In particular, unlike a double data rate (DDR) or a graphics double data rate (GDDR) each only with a single data rate, a low-power double-data rate (LPDDR) which is a memory targeted for a portable application uses a high data rate when high-performance games are played, and has a low data rate when a simple operation such as web surfing is performed.

Research is being conducted on a transmitter targeted for the LPDDR as a method of transmitting data by changing various output driver structures.

Among data transmission methods, a pulse amplitude modulation (PAM) signaling mode and a non-return to zero (NRZ) signaling mode are signaling methods of transmitting bits of a certain size during one unit interval (UI).

FIG. 2 is a diagram for explaining the NRZ signaling mode. FIG. 3 is diagram for explaining a PAM-4 mode among PAM signaling modes.

As illustrated in FIG. 2, NRZ is a technology of transmitting 1-bit being 0 or 1 within one UI. As illustrated in FIG. 3, PAM-4 is a technology of transmitting 2-bit being 00, 01, 10, or 11 within one UI.

When a data rate is low, an operation using an NRZ mode may be performed to reduce power consumption, and when a data rate is high, operation may be performed using the PAM-4 mode.

In relation to this, technologies in the related art adopt a method of transmitting data by selecting an NRZ data path and a PAM-4 data path according to the two modes. However, since data paths according to the two modes are separated from each other, unnecessary circuits may be present.

In detail, since half of data may be transmitted in the NRZ mode compared to the PAM-4 mode, when a same amount of data is to be transmitted, serialization of data needs to be performed one more time to transmit the data to a receiver, compared to the PAM-4 mode.

On the other hand, when data is to be transmitted in the PAM-4 mode, a data serializer used in the NRZ mode is not needed. Thus, data needs to be transmitted to a receiver through another path.

In addition, encoder circuits for the NRZ mode and the PAM-4 mode, i.e., different modes are also needed.

Thus, an area and power may be consumed due to unnecessary circuits.

Therefore, there is a need for a method of reducing an area by omitting unnecessary circuits, as well as reducing power consumption caused by circuits.

PRIOR ART DOCUMENTS

Patent Documents (Patent document 1) Korea Patent Registration No. 10-2220171

SUMMARY OF THE INVENTION

Therefore, the present disclosure has been made in view of the above problems, and it is an object of the present disclosure to provide a dual-mode transmitter for a low-power double-data rate (LPDDR) interface capable of reducing an area and reducing the power consumed in a circuit by eliminating unnecessary circuits by sharing all circuits by removing an encoder without having to separate an NRZ data path from a PAM-4 data path according to a mode signal.

To accomplish the above object, according to one aspect of the present disclosure, there is provided a dual-mode transmitter configured to operate in either a non-return to zero (NRZ) mode or a pulse amplitude modulation (PAM)-4 mode, the dual-mode transmitter including: a pseudorandom binary sequence (PRBS) generator configured to generate a transmission signal to be transmitted to a dual-mode receiver; at least one serializer configured to serialize the transmission signal; a single-ended to differential (S2D) configured to convert the serialized transmission signal in a form of a single-ended signal into a differential signal; a ZQ calibration configured to generate a result code for matching an impedance value at an output terminal of the dual-mode transmitter with a terminating resistance value of the dual-mode receiver; a pre-driver configured to combine the differential signal obtained by the converting and the result code; a controller configured to control to generate a mode signal and a clock (CLK) signal for performing an operation in the PAM-4 mode or the NRZ mode according to a transmission rate of the transmission signal; and an output driver including at least one most significant bit (MSB) data path and at least one least significant bit (LSB) data path to output the combined differential signal and result code as an output signal in a form of a combination of MSB data and LSB data, wherein the output driver includes a switch in each of the at least one MSB data path and the at least one LSB data path, the switch being controlled to be turned on or off according to the mode signal and the clock signal so that a connection is made to the at least one MSB data path and the at least one LSB data path in the PAM-4 mode, and a connection is made to the at least one MSB data path or the at least one LSB data path in the NRZ mode.

In addition, the at least one MSB data path may include first and second MSB data paths each including an MSB data generator configured in a form of a driver of a pair of N-channel metal-oxide semiconductor (NMOS) transistors to generate MSB data, a first additional driver controlled to be turned on or off according to a value obtained by a multiplication operation of the MSB data with an inverse signal of the mode signal, and a first switch controlled to be turned on or off according to a value obtained by a sum operation of the clock signal and the mode signal, and the at least one LSB data path includes first and second LSB data paths each including an LSB data generator configured in a form of a driver of a pair of NMOS transistors to generate LSB data, a second additional driver controlled to be turned on or off according to a value obtained by a multiplication operation of the LSB data with the inverse signal of the mode signal, and a second switch controlled to be turned on or off according to a value obtained by a sum operation of an inverse signal of the clock signal and the mode signal or a value obtained by a multiplication operation of the inverse signal of the clock signal and the inverse signal of the mode signal.

In addition, in a case when the output driver is in the PAM-4 mode, the first switch is controlled to be turned on and the second switch in the first LSB data path is controlled to be turned on so that the first MSB data path and the second MSB data path and the first LSB data path are connected to each other.

In addition, in a case when the output driver is in the NRZ mode, when the clock signal is 1, the first switch is controlled to be turned on so that the first MSB data path and the second MSB data path are connected to each other, when the clock signal is 0, the second switch is controlled to be turned on so that the first LSB data path and the second LSB data path are connected to each other.

In addition, the first MSB data path, the second MSB data path, the first LSB data path and the second LSB data path are connected in parallel to each other.

According to an aspect of the present embodiment, a dual-mode transmitter for an LPDDR interface may be provided to reduce an area as well as to reduce power consumption in a circuit by removing an unnecessary circuit by sharing all circuits according to a mode signal MODE by removing an encoder, without having to separate an NRZ data path from a PAM-4 data path according to a mode signal.

DETAILED DESCRIPTION OF THE PREFERRED EMBODIMENT

Figure 1:
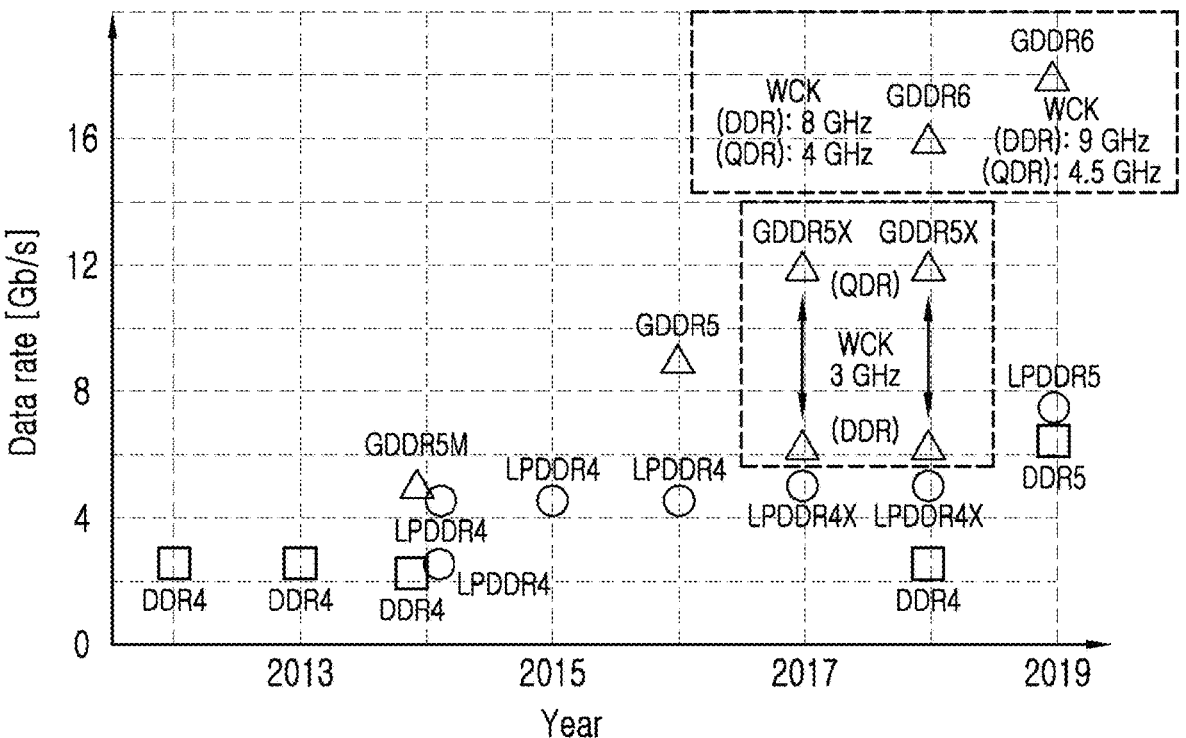
FIG. 1 is a diagram illustrating data rates according to a memory interface.
Figure 2:
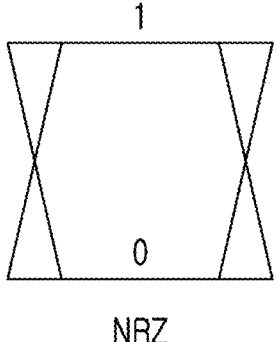
FIG. 2 is a diagram for explaining a non-return to zero (NRZ) signaling mode.
Figure 3:
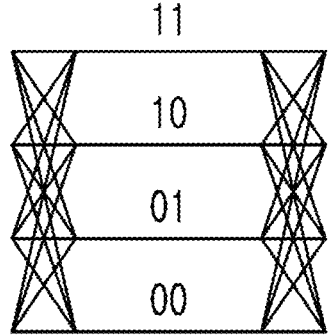
FIG. 3 is a diagram for explaining a pulse amplitude modulation (PAM) signaling mode.

In the following detailed description of the present disclosure, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein, in connection with one embodiment, may be implemented within other embodiments without departing from the spirit and scope of the present disclosure. In addition, it is to be understood that a location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Components according to the present disclosure may be defined by functional distinction rather than physical distinction, and may be defined by functions that the components perform respectively. Respective components may be implemented as hardware or as program codes and processing units that perform respective functions, and functions of two or more components may be implemented in a single component. Therefore, it should be noted that names given to components in the following embodiments are not to physically distinguish each component, but to imply a representative function performed by each component, and that the technical idea of the present disclosure is not limited by the names of the components.

Hereinafter, embodiments of the present disclosure will be described in detail with reference to the accompanying drawings.

Figure 4:
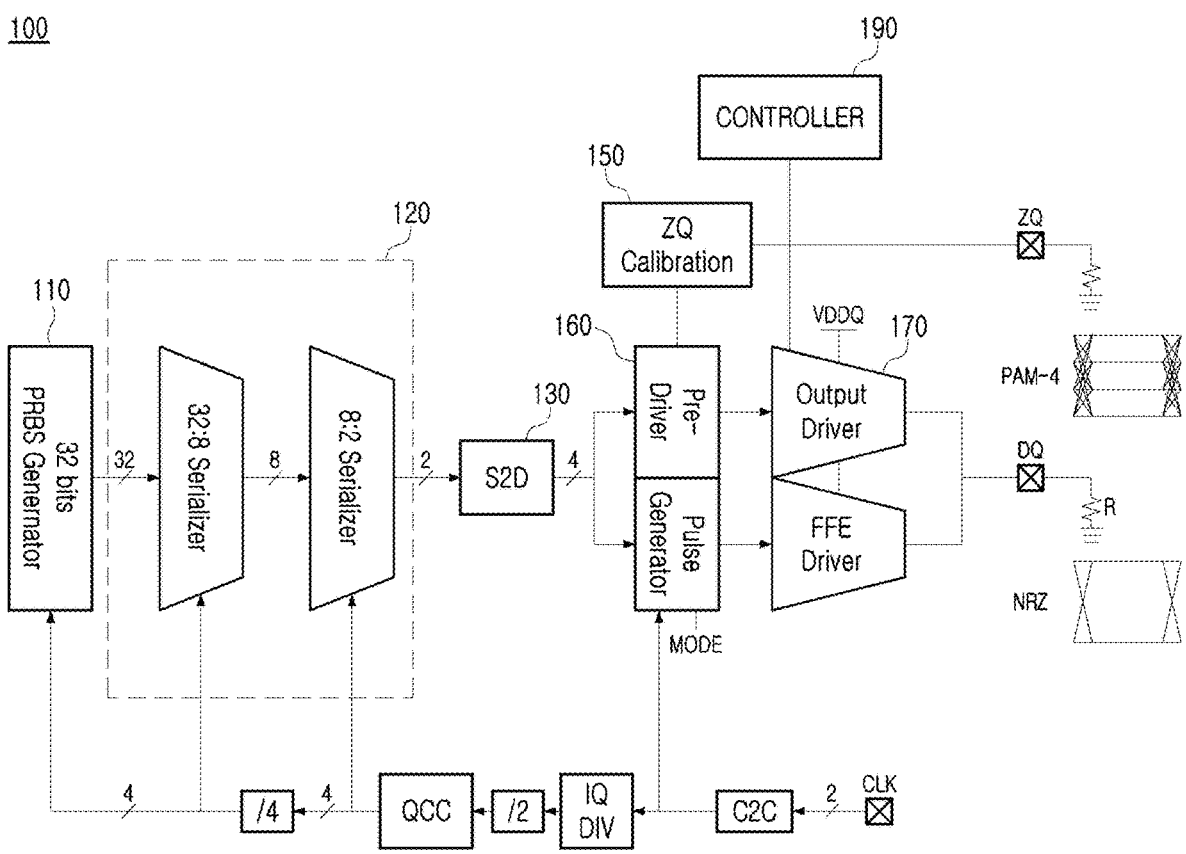
FIG. 4 is a diagram for explaining a dual-mode transmitter for a low-power double-data rate (LPDDR) interface according to an embodiment of the present disclosure.

FIG. 4 is a diagram for explaining a dual-mode transmitter 100 for a low-power double-data rate (LPDDR) interface according to an embodiment of the present disclosure.

The dual-mode transmitter 100 according to the present embodiment is provided to reduce an area as well as to reduce power consumption in a circuit by removing an unnecessary circuit by sharing all circuits by removing an encoder without separating an NRZ data path from a PAM-4 data path according to a mode signal MODE.

To do so, the dual-mode transmitter 100 according to the present embodiment may operate in either an NRZ mode or a PAM-4 mode, and may include a pseudorandom binary sequence (PRBS) generator 110, a serializer 120, a single-ended to differential (S2D) 130, a ZQ calibration 150, a pre-driver 160, an output driver 170, and a controller 190.

The PRBS generator 110 may generate a transmission signal to be transmitted to a dual-mode receiver.

The serializer 120 according to the present embodiment is provided to serialize the transmission signal.

In addition, at least one serializer 120 may be provided and placed in rear of the PRBS generator 110.

The at least one serializer 120 is illustrated as a 32:8 serializer and an 8:2 serializer each configured to serialize an input signal to ¼ as shown in FIG. 4, but is not limited thereto.

In relation to this, the serializer 120 may transmit a serialized transmission signal in a form of a single-ended signal to the S2D 130.

Meanwhile, the S2D 130 according to the present embodiment may be placed in rear of the serializer 120, and convert the serialized transmission signal in the form of the single-ended signal into a differential signal.

In addition, the S2D 130 may transmit the differential signal toward the ZQ calibration 150.

The ZQ calibration 150 according to the present embodiment is provided to generate a result code for matching an impedance value at an output terminal of the dual-mode transmitter 100 with a terminating resistance value of the dual-mode receiver.

For example, it is assumed that the ZQ calibration 150 in the present embodiment matches an impedance value of each unit of the output driver 170 with 3R, but the present disclosure is not limited thereto.

The ZQ calibration 150 may generate a pull-up code ZQU [4:0] of a ZQ code and a pull-down code ZQD [4:0] of the ZQ code with 10 bits in total as a result code.

In addition, the ZQ calibration 150 may provide the generated result code to the pre-driver 160.

Meanwhile, the pre-driver 160 may combine the differential signal obtained by the converting and transmitted from the S2D 130 and the result code received from the ZQ calibration 150.

To do so, the pre-driver 160 may be placed in rear of the ZQ calibration 150 and the S2D 130 to be connected to the ZQ calibration 150 and the S2D 130.

The pre-driver 160 may transmit the combined differential signal and result code to the output driver 170.

The controller 190 may be provided to control to generate a mode signal MODE and a clock signal CLK so that the dual-mode transmitter 100 operates in the PAM-4 mode or the NRZ mode according to a transmission rate of the transmission signal. In FIG. 4, the controller 190 is shown as being connected only to the output driver 170 for convenience of description, but is not limited thereto and may be connected to any component constituting the dual-mode transmitter 100.

Meanwhile, the output driver 170 is disposed to receive the combined differential signal and result code from the pre-driver 160 and output an output signal in a form of a combination of most significant bit (MSB) data and least significant bit (LSB) data. To do so, the output driver 170 may be connected to a DQ pad, i.e., a pad for input/output of data.

In addition, the output driver 170 according to the present embodiment may be designed based on a low voltage swing termination logit (LVSTL) used in a mobile application.

Figure 5:
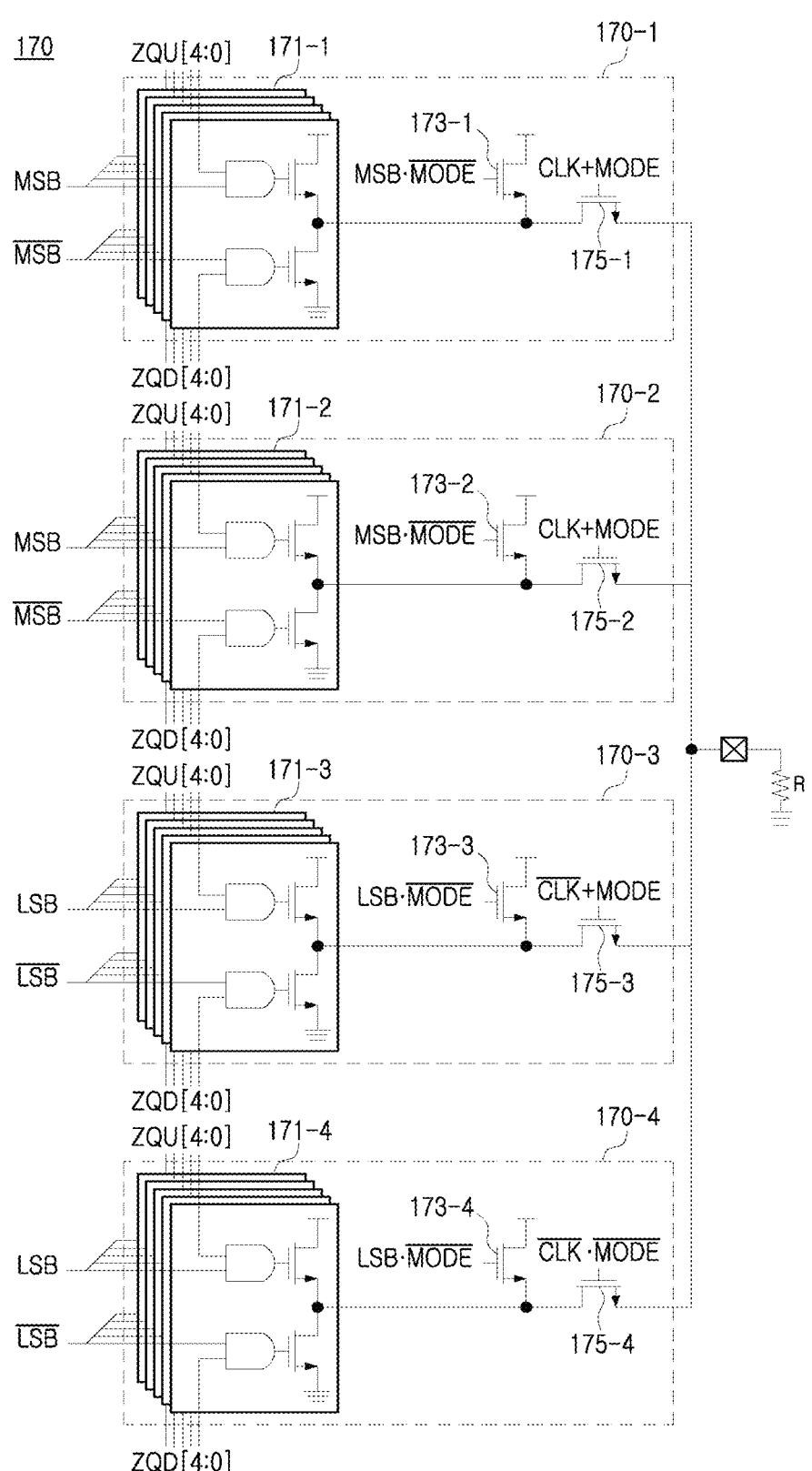
FIG. 5 is a diagram for explaining an output driver of FIG. 4.

In detail, FIG. 5 is a diagram for explaining the output driver 170 according to the present embodiment. The output driver 170 according to the present embodiment may include at least one of each of MSB data paths 170-1 and 170-2 and at least one of each of LSB data path 170-3 and 170-4.

In addition, a first MSB data path 170-1, a second MSB data path 170-2, a first LSB data path 170-3, and a second LSB data path 170-4 each constituting the output driver 170 are connected in parallel to each other.

In addition, the output driver 170 according to the present embodiment may have a switch 175 controlled to be turned on or off according to the mode signal MODE and the clock signal CLK and arranged in each of the MSB data path 170-1 and 170-2 and the data path 170-3 and 170-4 so that the MSB data paths 170-1 and 170-2 and the LSB data path 170-3 are connected to each other when the dual-mode transmitter 100 is in the PAM-4 mode, and connected to the MSB data paths 170-1 and 170-2 or the LSB data paths 170-3 and 170-4 are connected to each other when the dual-mode transmitter 100 is in the NRZ mode.

The MSB data paths 170-1 and 170-2 may include the first MSB data path 170-1 and the second MSB data path 170-2.

In addition, the first MSB data path 170-1 and the second MSB data path 170-2 may include MSB data generators 171-1 and 171-2, first additional drivers 173-1 and 173-2, and first switches 175-1 and 175-2, respectively, as illustrated in FIG. 5.

The MSB data generators 171-1 and 171-2 are configured in a form of a driver of a pair of N-channel metal-oxide semiconductor (NMOS) transistors and provided to generate MSB data.

In addition, the MSB data generators 171-1 and 171-2 may transmit the generated MSB data to the output terminal.

The first additional drivers 173-1 and 173-2 are controlled to be turned on or off according to a value obtained by a multiplication operation of MSB data MSB with an inverse signal MODE of the mode signal MODE.

Meanwhile, the first switches 175-1 and 175-2 are controlled to be turned on or off according to a value obtained by a sum operation of the clock signal CLK and the mode signal MODE.

Meanwhile, the LSB data path 170-3 and 170-4 according to the present embodiment may include a first LSB data path 170-3 and a second LSB data path 170-4.

In addition, each of the first LSB data path 170-3 and the second LSB data path 170-4 may include LSB data generators 171-3 and 171-4, second additional drivers 173-3 and 173-4, and second switches 175-3 and 175-4, as illustrated in FIG. 5.

The LSB data generators 171-3 and 171-4 are configured in a form of a driver of a pair of NMOS transistors and is provided to generate LSB data.

In addition, the LSB data generators 171-3 and 171-4 may transmit the generated LSB data toward the output terminal.

The second additional drivers 173-3 and 173-4 are controlled to be turned on or off according to a value obtained by a multiplication operation of LSB data LSB with the inverse signal MODE of the mode signal MODE.

Meanwhile, the second switches 175-3 and 175-4 are controlled to be turned on or off according to a value obtained by a sum operation of an inverse signal CLA of the clock signal CLK and the mode signal MODE or a value obtained by a multiplication operation of the inverse signal CLA of the clock signal CLK and the inverse signal MODE of the mode signal MODE.

Hereinafter, a case when the output driver 170 according to the present embodiment operates in the PAM-4 mode and a case when the output driver 170 operates in the NRZ mode are described in detail.

FIGS. 6A to 6D are diagrams illustrating equivalent circuits in a case of operation in the PAM-4 mode. FIG. 7 is a timing diagram in a case of operation in the PAM-4 mode. In addition, as shown in FIG. 6, an output impedance is R.

When the output driver 170 is in the PAM-4 mode, i.e., when a mode signal is 1, the first switches 175-1 and 175-2 are controlled to be turned on and the second switch 175-3 in the first LSB data path 170-3 is controlled to be turned on. Thus, the first and second MSB data paths 170-1 and 170-2 and the first LSB data path 170-3 are connected to each other.

As such, in the PAM-4 mode, since three units of the output driver, i.e., the first and second MSB data paths 170-1 and 170-2 and the first LSB data path 170-3 operate at all times, there is no need to change an impedance value of 3R, which is a result obtained from the ZQ calibration 150.

Accordingly, since an operation is performed regardless of the clock signal CLK in the PAM-4 mode, the three units, i.e., the first and second MSB data paths 170-1 and 170-2 and the first LSB data path 170-3 are connected to each other at all times.

As illustrated in the timing diagram of FIG. 7, since two bits are transmitted to data 1-UI in the PAM-4 mode, MSB data and LSB data are combined with each other to be output simultaneously. An operational equivalent circuit for each data is shown in FIGS. 6A to 6D.

Figure 6A:
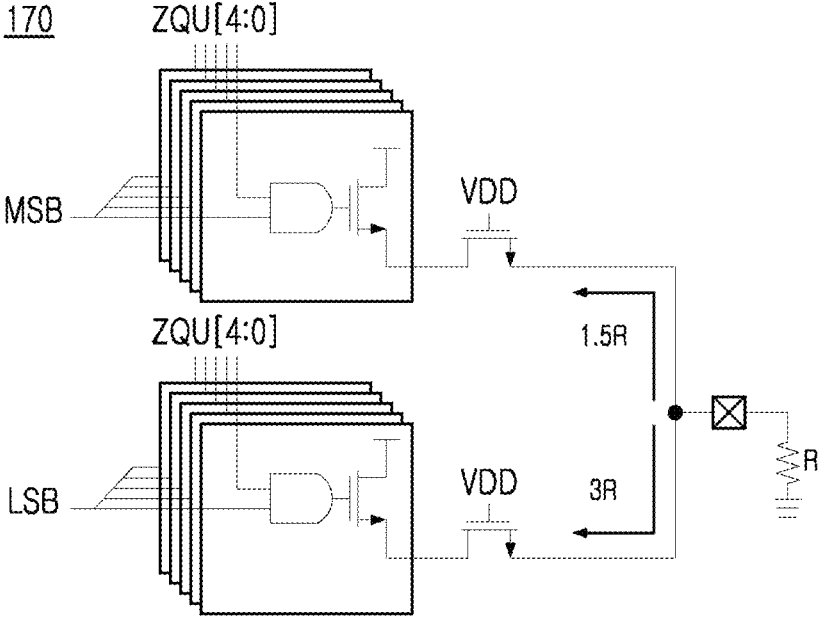
FIGS. 6A to 6D are diagrams illustrating equivalent circuits when the dual-mode transmitter according to an embodiment of the present disclosure operates in a PAM-4 mode.
Figure 7:
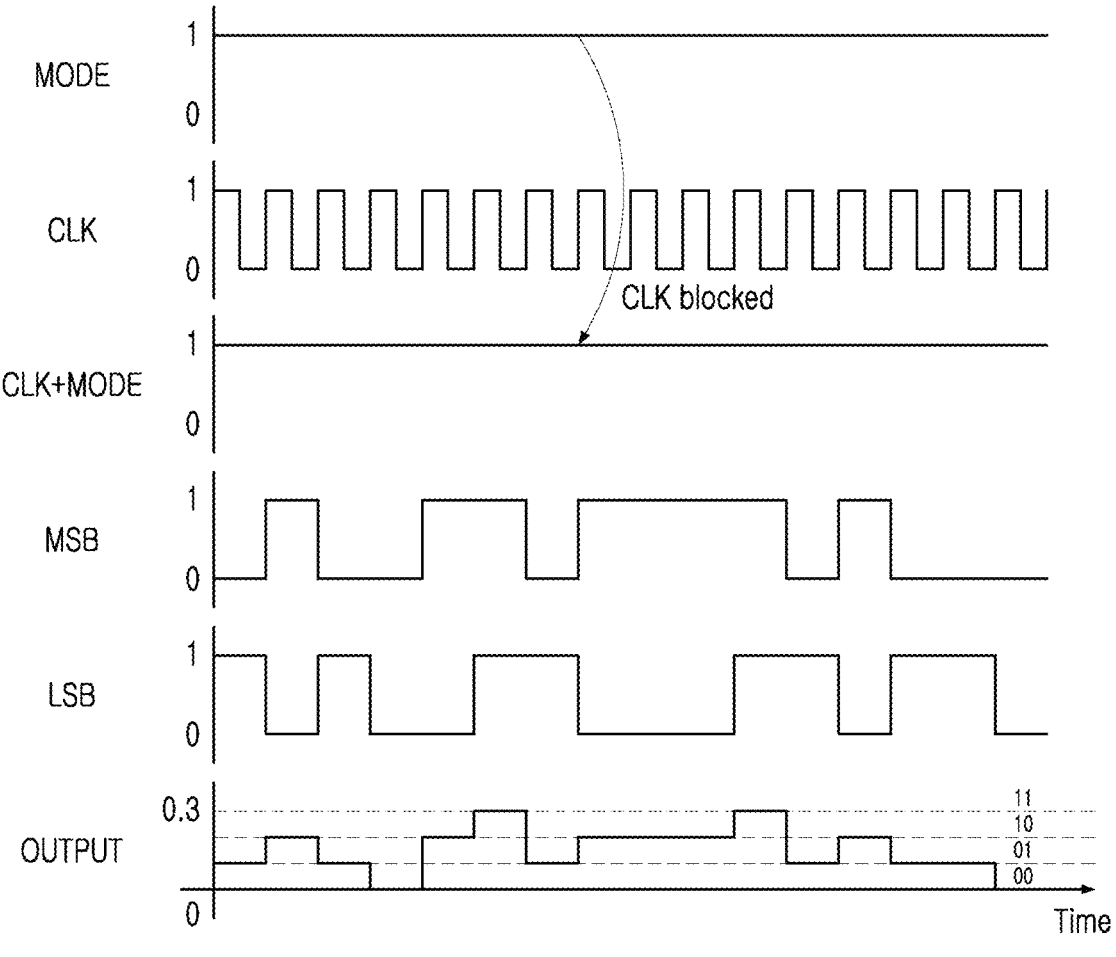
FIG. 7 is a timing diagram when the dual-mode transmitter according to an embodiment of the present disclosure operates in the PAM-4 mode.

FIG. 6A illustrates an equivalent circuit when both MSB data and LSB data are 1 (HIGH). According to a result obtained from the ZQ calibration 150, each of the MSB data paths 170-1 and 170-2 matches an impedance value of 1.5R, and the first LSB data path 170-3 matches an impedance value of 3R.

Accordingly, an impedance value of the output driver 170 as viewed from the output terminal is 1.5R//3R=R, and outputs (½)*VDDQ according to a voltage divider rule.

Figure 6B:
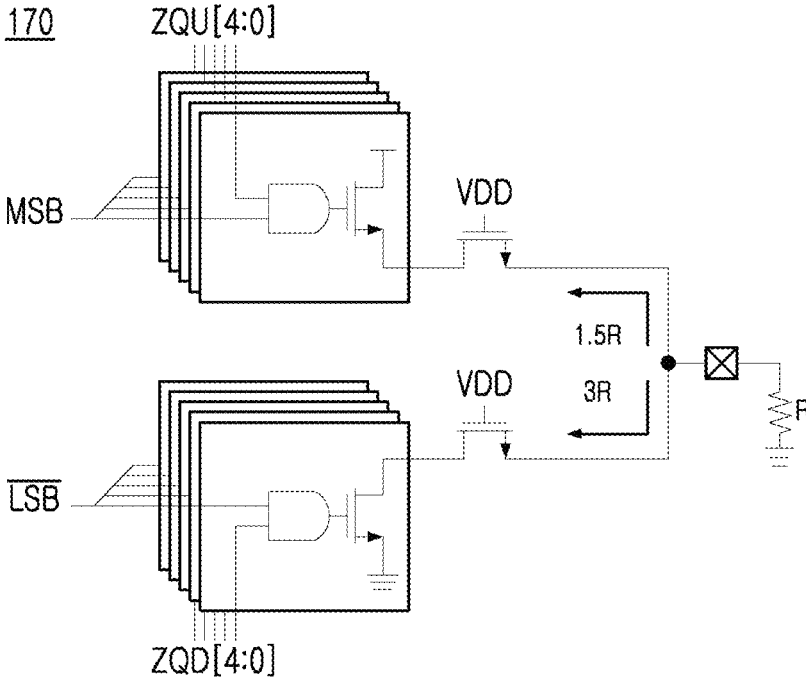

Meanwhile, FIG. 6B shows an equivalent circuit when MSB data is 1 (HIGH) and LSB data is 0 (LOW). In this case, an impedance value viewed toward a VDDQ is 1.5R, and an impedance viewed toward a GND is 3R//R=(¾)R, and thus, (⅓)*VDDQ is output.

Figure 6C:
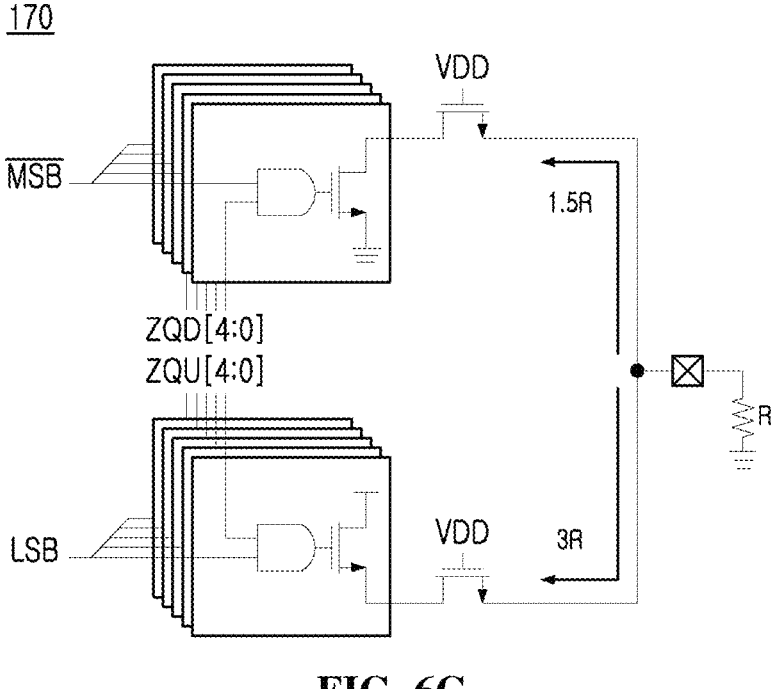

On contrary to FIG. 6B, FIG. 6C illustrates an equivalent circuit diagram when MSB data is 0 (LOW) and LSB data is 1 (HIGH). In this case, an impedance viewed toward a VDDQ is 3R and an impedance viewed toward GND is 1.5R//R=(⅗)R, and thus, (⅙)*VDDQ is output.

Figure 6D:
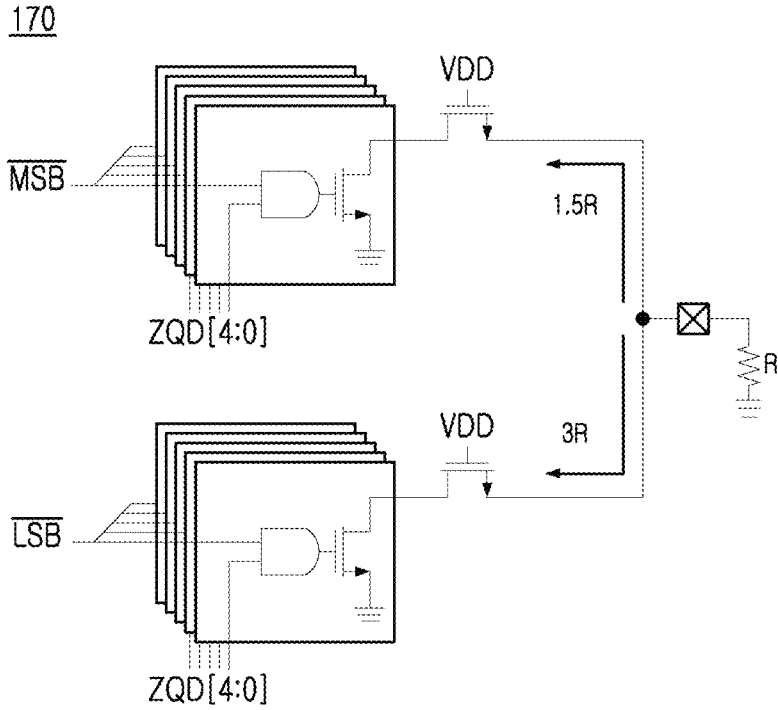

FIG. 6D shows an equivalent circuit when both MSB data and LSB data are 0 (LOW). In this case, since a driver looking toward VDDQ is not present, 0 V may be output.

Thus, since the output driver 170 according to the present embodiment may change an output impedance value, an encoder needed to transmit data in the PAM-4 mode may be omitted. Accordingly, unnecessary circuits may be removed to reduce an area.

Figure 8A:
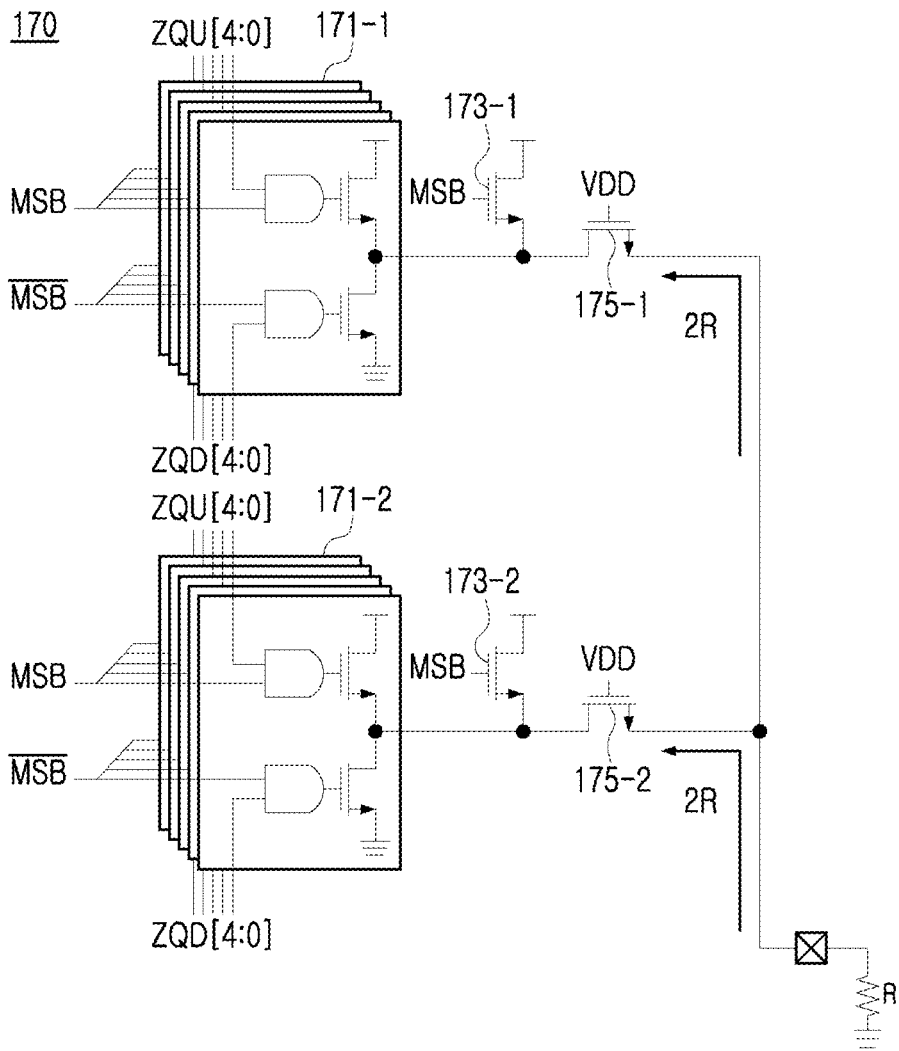
FIGS. 8A and 8B are diagrams illustrating equivalent circuits when the dual-mode transmitter according to an embodiment of the present disclosure operates in an NRZ mode.
Figure 8B:
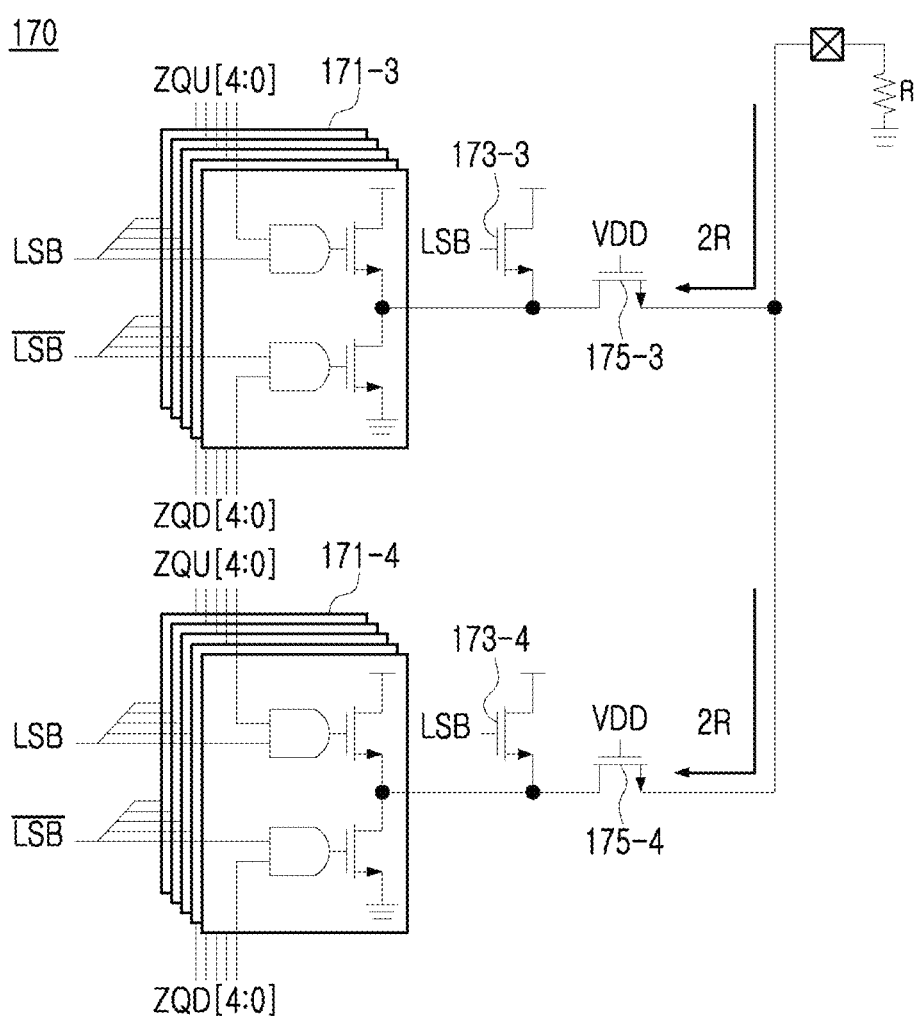
Figure 9:
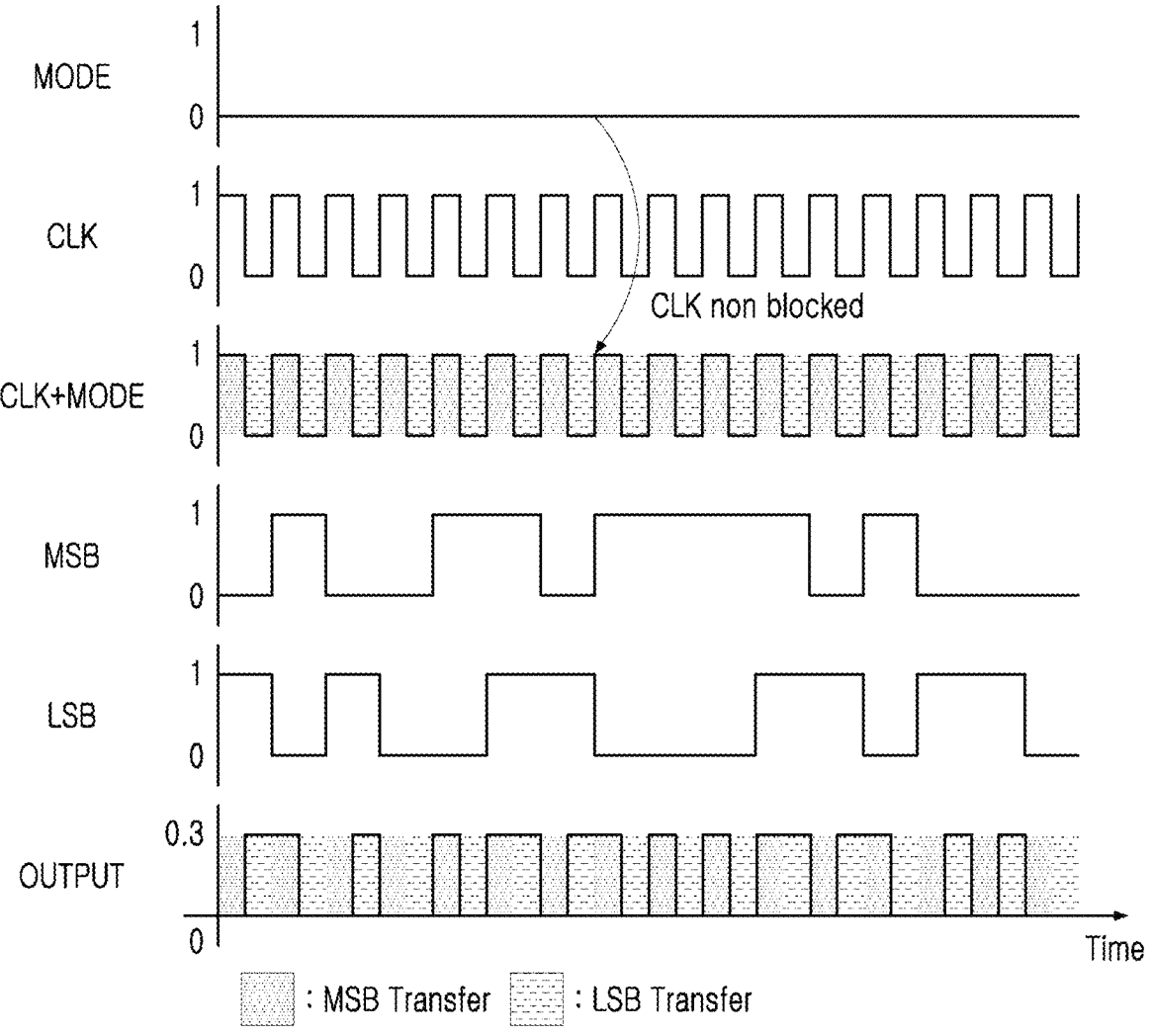
FIG. 9 is a timing diagram when the dual-mode transmitter according to an embodiment of the present disclosure operates in the NRZ mode.

Meanwhile, FIGS. 8A and 8B are diagrams illustrating equivalent circuits in a case of operation in the NRZ mode. FIG. 9 is a timing diagram in a case of operation in the NRZ mode.

In detail, FIG. 8A illustrates a case when a clock signal CLK is 1 (HIGH). FIG. 8B illustrates a case when a clock signal CLK is 0 (LOW). The NRZ mode is a method of selecting and transmitting MSB data or LSB data to a dual-mode receiver according to a toggle of a clock signal. The serializer 120 may operate based on a same principle as that of this method.

As a result code of the ZQ calibration 150, respective units 170-1 to 170-4 of the output driver 170 have an output impedance value of 3R.

However, in the NRZ mode, only two units operate at all times regardless of whether the clock signal CLK is 1 or 0. Thus, an impedance value of each unit of the output driver 170 needs to be adjusted to 2R.

Thus, in the output driver 170, when the clock signal CLK is 1 in the NRZ mode, the first switches 175-1 and 175-2 are controlled to be turned on or off as illustrated in FIG. 8A to connect the first and second MSB data paths 170-1 and 170-2 to each other. At this time, the first additional drivers 173-1 and 173-2 may also be controlled to be turned on and off.

In the output driver 170, when the clock signal CLK is 0 in NRZ mode, the second switches 175-3 and 175-4 are controlled to be turned on to connect the first and second LSB data paths 170-3 and 170-4 to each other. At this time, the second additional drivers 173-3 and 173-4 may also be controlled to be turned on and off.

Thus, since an impedance value viewed from the output terminal becomes R when the clock signal CLK is either 0 or 1, a reflected wave may not be generated. Particularly, in the present embodiment, an impedance value may be adjusted to 2R by adding a PU driver such as the first additional driver 173-1 or 173-2, or the second additional driver 173-3 or 173-4.

Accordingly, like the present embodiment, when the output driver 170 operates on a same principle as that of the serializer 120, data is serialized last. Thus, a 2:1 serializer equipped in a transmitter in the related art is not needed, and a corresponding function may be implemented in the output driver 170.

Then, since a clock signal CLK being applied may select, serialize, and transmit data to the dual-mode receiver, a final output data transmission rate becomes twice an MSB/LSB data transmission rate.

Thus, a 2:1 serializer may be omitted. Accordingly, design complexity as well as power consumption may be reduced.

Meanwhile, FIGS. 10 to 13 are diagrams showing an experimental result for explaining an effect of the dual-mode transmitter 100 according to an embodiment of the present disclosure.

Figure 10:
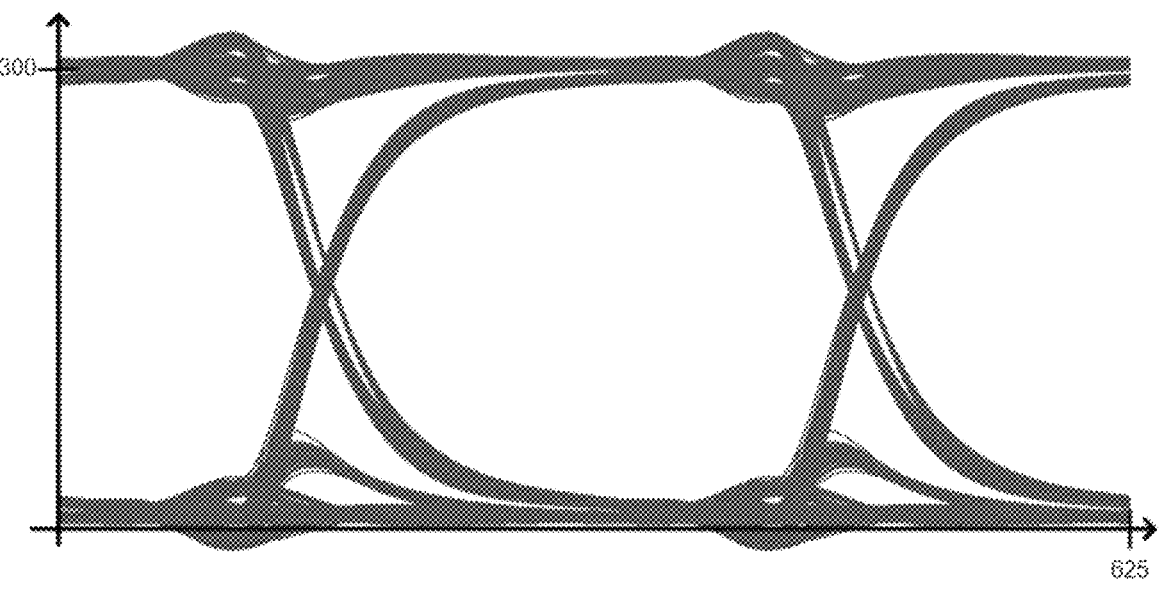
FIGS. 10 to 13 are diagrams showing an experimental result for explaining an effect of the dual-mode transmitter according to an embodiment of the present disclosure.

FIG. 10 is a diagram illustrating an eye diagram after a channel passage when the dual-mode transmitter 100 operates in the NRZ mode. This shows a result of operation at a data rate of 3.2-Gb/s in the NRZ mode is shown.

Figure 11:
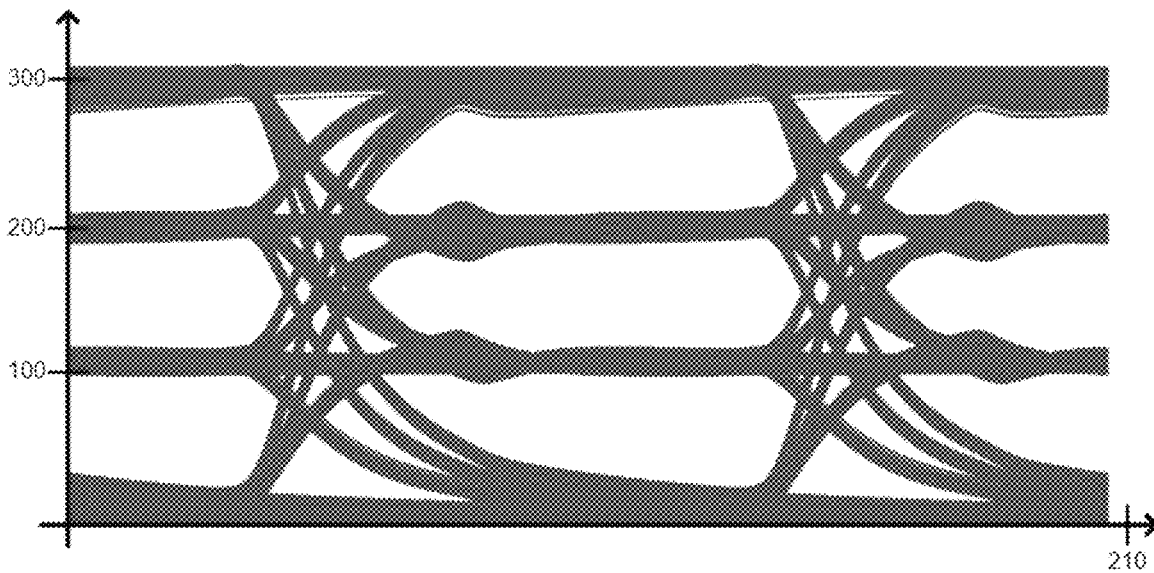

FIG. 11 is a diagram illustrating an eye diagram after a channel passage when the dual-mode transmitter 100 operates in the PAM-4 mode. This shows a result of operation a data rate of 19.8-Gb/s in the PAM-4 mode.

Figure 12:
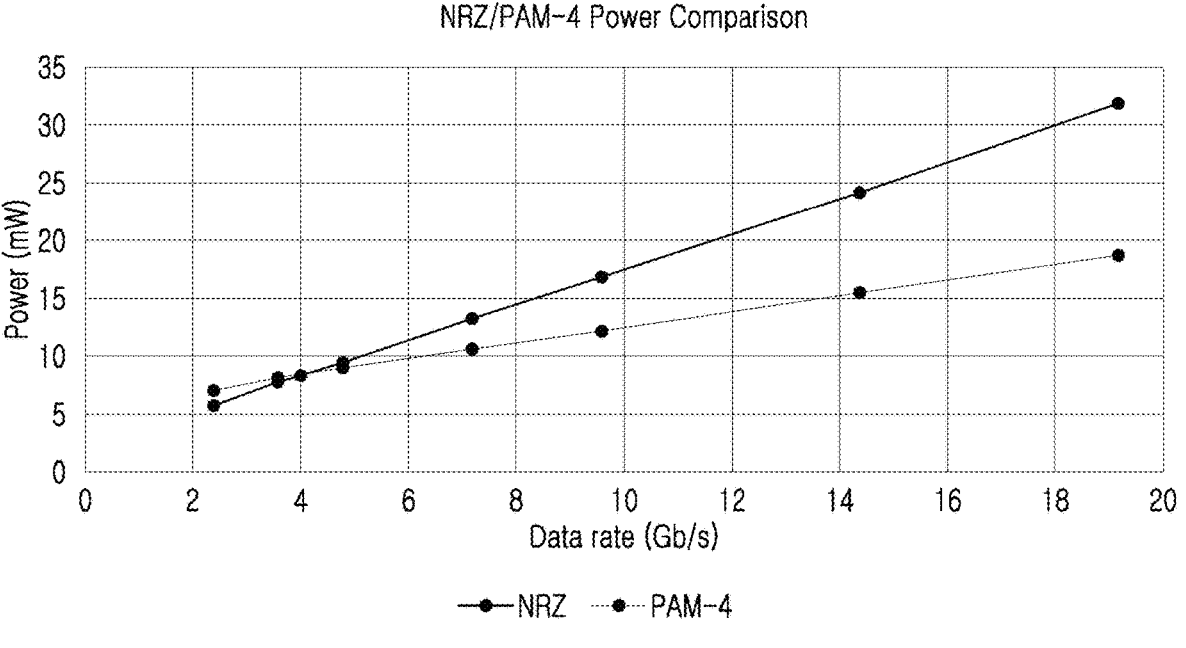

FIG. 12 is a graph showing a comparison of power consumptions per data transmission rate for the NRZ/ PAM-4 mode with respect to the dual-mode transmitter 100 according to the present embodiment.

As shown in FIG. 12, it may be understood that power consumption is low at a data rate less than −4 Gb/s in the NRZ mode, and power consumption is low at a rate equal to or greater than −4 Gb/s in the PAM-4 mode.

Figure 13:
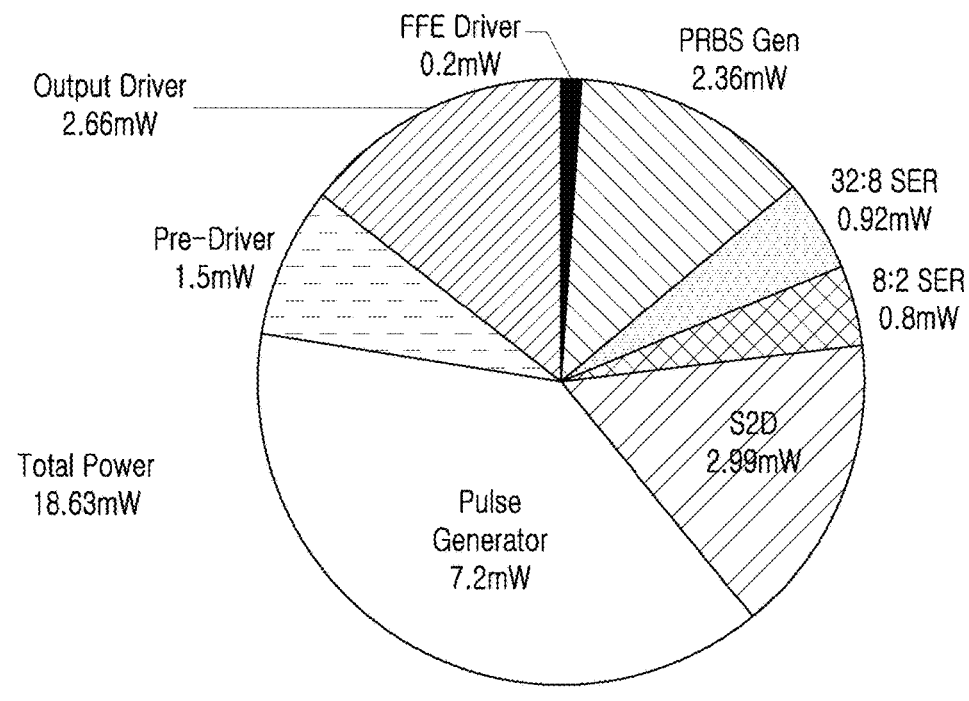

Meanwhile, FIG. 13 illustrates power breakdown during operation at a data rate of 19.2-Gb/s in the PAM-4 mode, and total power consumption is simulated as 18.63-mW.

Accordingly, the dual-mode transmitter 100 according to the present embodiment may be applied to a transmitter of an LPDDR memory used in mobile applications such as a smartphone, a laptop computer, etc.

Although various embodiments of the present disclosure are illustrated and described, the present disclosure is not limited to the particular embodiments described above and various changes and modifications thereof may be made by those skilled in the art without departing from the essence of the disclosure as claimed in the claims. Such changes and modifications should not be understood as being separate from the technical idea or viewpoint of the present disclosure.

DESCRIPTION OF SYMBOLS

| | |
|---|---|
| 100: Dual-mode transmitter | 110: PRBS Generator |
| 120: Serializer | 130: S2D |

-continued

| 150: ZQ Calibration | 160: Pre-driver |
| 170: Output Driver | 190: Controller |

The invention claimed is:

1. A dual-mode transmitter configured to operate in either a non-return to zero (NRZ) mode or a pulse amplitude modulation (PAM)-4 mode, the dual-mode transmitter comprising:

a pseudorandom binary sequence (PRBS) generator configured to generate a transmission signal to be transmitted to a dual-mode receiver;

at least one serializer configured to serialize the transmission signal;

a single-ended to differential (S2D) configured to convert the serialized transmission signal in a form of a single-ended signal into a differential signal;

a ZQ calibration configured to generate a result code for matching an impedance value at an output terminal of the dual-mode transmitter with a terminating resistance value of the dual-mode receiver;

a pre-driver configured to combine the differential signal obtained by the converting and the result code;

a controller configured to control to generate a mode signal and a clock (CLK) signal for performing an operation in the PAM-4 mode or the NRZ mode according to a transmission rate of the transmission signal; and an output driver comprising at least one most significant bit (MSB) data path and at least one least significant bit (LSB) data path and configured to output the combined differential signal and result code as an output signal in a form of a combination of MSB data and LSB data, wherein the output driver further comprises a switch in each of the at least one MSB data path and the at least one LSB data path, the switch being controlled to be turned on or off according to the mode signal and the CLK signal such that the output driver is configured to be connected to the at least one MSB data path and the at least one LSB data path in the PAM-4 mode, and to the at least one MSB data path or the at least one LSB data path in the NRZ mode, wherein the at least one MSB data path comprises first and second MSB data paths each comprising an MSB data generator configured in a form of a driver of a pair of N-channel metal-oxide semiconductor (NMOS) transistors to generate the MSB data, a first additional driver controlled to be turned on or off according to a value obtained by a multiplication operation of the MSB data with an inverse signal of the mode signal, and a first switch controlled to be turned on or off according to a value obtained by a sum operation of the CLK signal and the mode signal, and wherein the at least one LSB data path comprises first and second LSB data paths each comprising an LSB data generator configured in a form of a driver of a pair of NMOS transistors to generate the LSB data, a second additional driver controlled to be turned on or off according to a value obtained by a multiplication operation of the LSB data with the inverse signal of the mode signal, and a second switch controlled to be turned on or off according to a value obtained by a sum operation of an inverse signal of the CLK signal and the mode signal or a value obtained by a multiplication operation of the inverse signal of the CLK signal and the inverse signal of the mode signal.

2. The dual-mode transmitter of claim 1, wherein, in a case when the output driver is in the PAM-4 mode, the first switch is controlled to be turned on and the second switch in the first LSB data path is controlled to be turned on so that the first MSB data path and the second MSB data path and the first LSB data path are connected to each other.

3. The dual-mode transmitter of claim 1, wherein, in a case when the output driver is in the NRZ mode, when the CLK signal is 1, the first switch is controlled to be turned on so that the first MSB data path and the second MSB data path are connected to each other, and when the CLK signal is 0, the second switch is controlled to be turned on so that the first LSB data path and the second LSB data path are connected to each other.

4. The dual-mode transmitter of claim 1, wherein the first MSB data path, the second MSB data path, the first LSB data path and the second LSB data path are connected in parallel to each other.

* * * * *